US007818786B2

(12) United States Patent
Yoon et al.

(10) Patent No.: US 7,818,786 B2
(45) Date of Patent: Oct. 19, 2010

(54) APPARATUS AND METHOD FOR MANAGING SESSION STATE

(75) Inventors: Seung Yong Yoon, Daejeon (KR); Jin Tae Oh, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1349 days.

(21) Appl. No.: 11/298,114

(22) Filed: Dec. 8, 2005

(65) Prior Publication Data

US 2007/0044142 A1   Feb. 22, 2007

(30) Foreign Application Priority Data

Aug. 19, 2005   (KR) ....................... 10-2005-0076454
Sep. 14, 2005   (KR) ....................... 10-2005-0085591

(51) Int. Cl.
*G06F 7/04* (2006.01)
(52) U.S. Cl. ............................................. 726/3; 726/23
(58) Field of Classification Search ..................... 726/3, 726/23, 25
See application file for complete search history.

(56) References Cited

U.S. PATENT DOCUMENTS 7,290,283 B2 * 10/2007 Copeland, III ................ 726/25
2004/0013112 A1 * 1/2004 Goldberg et al. ............ 370/389

OTHER PUBLICATIONS

Brian Dyck; SANS: Malware FAQ: Checkpoint Firewall-1 ACK DOS Vulnerability and Sample Incident. A Collection articles written 1999-2001.*
"Exploiting Stateful Inspection of Network Security in Reconfigurable Hardware," Shaomeng Li et al. Field-Programmable Logic and Applications, vol. 2778/2003, pp. 1153-1157.

* cited by examiner

*Primary Examiner*—Jung Kim
*Assistant Examiner*—Samson B Lemma
(74) *Attorney, Agent, or Firm*—Ladas & Parry LLP

(57) ABSTRACT

An apparatus and method for managing a session state are provided. The apparatus for managing a session state during transmission control protocol (TCP) handshaking includes: a session index unit producing and managing an index including 5-tuple information of a session corresponding to an input packet; a detailed information manager generating and managing an entry by extracting state information of a session in which a predetermined time does not pass after the session has been completely established, to respond to an intrusion detection against the input packet when the index is produced; a brief information manager generating and managing an entry including state information, which includes states of session connection and disconnection and directionality of the input packet, of a session in which a predetermined time elapses after the session has been completely established; and a search unit searching an index of the session corresponding to the input packet in the session index unit, and, if an index does not exist, searching the brief information manager after the session has been completely established.

23 Claims, 14 Drawing Sheets

FIG. 4

| FIELD | SIZE | DESCRIPTION |
|---|---|---|
| CLIENT STATE | 4 BITS | 0 : CLOSED<br>1 : LISTEN<br>2 : SYN_RCVD<br>3 : SYN_SENT<br>4 : ESTABLISHED<br>5 : CLOSE_WAIT<br>6 : LAST_ACK<br>7 : FIN_WAIT_1<br>8 : CLOSING<br>9 : FIN_WAIT_2<br>10 : TIME_WAIT |
| SERVER STATE | 4 BITS | SAME AS CLIENT STAFF |
| CONNECTION STATE | 32 BITS | 0 : TCP INITIALIZATION<br>1 : TCP ESTABLISHMENT<br>2 : TCP TERMINATION<br>3 : ...<br>* ASSIGN ENOUGH BIT SPACE TO TRACK STATES (HTTP, FTP, TELNET, ...) EACH OF APPLICATION PROTOCOLS AT TCP L7 AND TCP L4 AS WELL |
| CLIENT TTL | 8 BITS | MAINTAIN THE LATEST TTL VALUE ALL THE TIME |
| SERVER TTL | 8 BITS | MAINTAIN THE LATEST TTL VALUE ALL THE TIME |
| CLIENT SEQUENCE NUMBER | 32 BITS | MAINTAIN THE LATEST SEQUENCE NUMBER ALL THE TIME STARTING FROM ISN |
| SERVER SEQUENCE NUMBER | 32 BITS | MAINTAIN THE LATEST SEQUENCE NUMBER ALL THE TIME STARTING FROM ISN |
| CLIENT ACKNOWLEDGE NUMBER | 32 BITS | DIRECTION FILLS WITH LAST ACKNOWLEDGE NUMBER OF PACKET THAT IS TO CLIENT (SERVER) |
| SERVER ACKNOWLEDGE NUMBER | 32 BITS | DIRECTION FILLS WITH LAST ACKNOWLEDGE NUMBER OF PACKET THAT IS TO CLIENT (SERVER) |
| CLIENT WINDOW SIZE | 16 BITS | DIRECTION FILLS WITH WINDOW SIZE OF PACKET THAT IS TO CLIENT (SERVER) |
| SERVER WINDOW SIZE | 16 BITS | |

FIG. 5

| FIELD | SIZE | DESCRIPTION |
|---|---|---|
| ESTABLISHMENT | 1 BIT | CONNECTION STATE OF SESSION<br>0 : DISCONNECTED<br>1 : CONNECTED |
| HALF-CLOSE | 1 BIT | HALF-CLOSE STATE OF SESSION<br>0 : NOT HALF-CLOSE<br>1 : HALF-CLOSE STATE |

APPARATUS AND METHOD FOR MANAGING SESSION STATE

CROSS-REFERENCE TO RELATED PATENT APPLICATIONS

This application claims the benefit of Korean Patent Application Nos. 10-2005-0076454, filed on 19 Aug. 2005 and 10-2005-0085591, filed on 14 Sep. 2005 in the Korean Intellectual Property Office, the disclosure of which is incorporated herein in its entirety by reference.

BACKGROUND OF THE INVENTION

1. Field of the Invention

The present invention relates to an apparatus and method for managing a session state for a stateful packet inspection (SPI).

2. Description of the Related Art

Conventional stateless analysis systems that detect intrusions using a packet at a point generate false positive alerts due to intrusion detection system evasion tools such as Stick or Snot.

A session stateful intrusion detection system such as a stateful packet inspection (SPI) has been introduced to solve the above problem. However, when a session state tracking function is used to perform session stateful intrusion detection, most currently available products cannot properly perform their functions due to rapid performance deterioration in the giga scale Internet.

Therefore, intrusion detection systems employing session stateful intrusion detection are required to increase their performance so as to catch up with the evolution speed of the rapidly developing Internet. To this end, most software-based products are changed into hardware-based products.

The session stateful intrusion detection must maintain and manage information of several hundreds of thousands to several millions sessions and solve lack of hardware resources so that hardware-based products can properly perform the giga scale Internet.

Since intrusion detection systems employing the session stateful intrusion detection maintain and manage information of sessions, they are vulnerable to denial of service (DoS) attacks such as synchronize sequence number (SYN) flooding. To solve this problem, a variety of methods such as Syn Cache, Syn Cookies, SynDefender, Syn Proxying, Synkill, etc. have been suggested. However, it is still quite difficult to solve the problem using these methods.

SUMMARY OF THE INVENTION

The present invention provides an apparatus and method for managing a session state that effectively manages sessions and a memory, and to provide a protection mechanism against a denial of service (DoS) attack by reducing an intrusion alert erroneously detected by a stateless analysis system and overcoming a problem of conventional session stateful systems which are not able to properly perform their functions due to rapid performance deterioration.

According to an aspect of the present invention, there is provided an apparatus for managing a session state in the process of transmission control protocol (TCP) handshaking, the apparatus comprising: a session index unit producing and managing an index including 5-tuple information of a session corresponding to an input packet; a detailed information manager generating and managing an entry by extracting state information of a session in which a predetermined time does not elapse after the session has been completely established, to respond to an intrusion detection against the input packet when the index is produced; a brief information manager generating and managing an entry including state information, which includes states of session connection and disconnection and directionality of the input packet, of a session in which a predetermined time elapses after the session has been completely established; and a search unit searching an index of the session corresponding to the input packet in the session index unit, and, if an index does not exist, searching the brief information manager after the session has been completely established.

The session index unit may use a least recently used (LRU) algorithm that sequentially stores the indexes and, if the session index unit is full, deletes a longest used index.

The detailed information manager may use the LRU algorithm that sequentially stores the entries and, if the detailed information manager is full, deletes a longest used entry.

The detailed information manager may generate linked lists for each of operations of receiving a SYN packet, transmitting a synchronize sequence number/acknowledge (SYN/ACK) packet, and receiving an ACK packet during TCP 3-way handshaking in addition to an initial linked list, and adds the entries to the linked list corresponding to each of the packets when the packets are input, wherein, if time required to add the entries to the linked list exceeds a predetermined critical threshold, the entries are inserted into a tail of the initial linked list.

The detailed information manager may further comprise a time to live (TTL) tracking alert issuer issuing an alert when a difference between TTL values of a current packet and a previous packet exceeds a predetermined threshold in order to determine whether a packet belonging to the session is normal if the session is completely established.

According to another aspect of the present invention, there is provided a method of managing a session state in the process of TCP handshaking, the method comprising: (a) building an index table by producing and managing an index including 5-tuple information of a session corresponding to an input packet; (b) generating a first entry table by generating and managing an entry by extracting state information of a session within a predetermined time before and after the session is completely established so as to respond to an intrusion detection against the input packet when the index is produced; (c) generating a second entry table by generating and managing an entry including state information, which includes directionality of the input packet and states of the session connection and disconnection, of a session after a predetermined time after the session is completely established; and (d) searching an index of the session corresponding to the input TCP packet in the session index unit, and, if an index does not exist, searching the second entry table after the session is completely established.

BRIEF DESCRIPTION OF THE DRAWINGS

The above and other features and advantages of the present invention will become more apparent by describing in detail exemplary embodiments thereof with reference to the attached drawings in which:

FIG. 4 is a table of detailed session state information stored in a detailed information manager illustrated in FIGS. 2 and 3;

FIG. 5 is a table of brief session state information stored in a brief information manager illustrated in FIGS. 2 and 3;

DETAILED DESCRIPTION OF THE INVENTION

Figure 1:
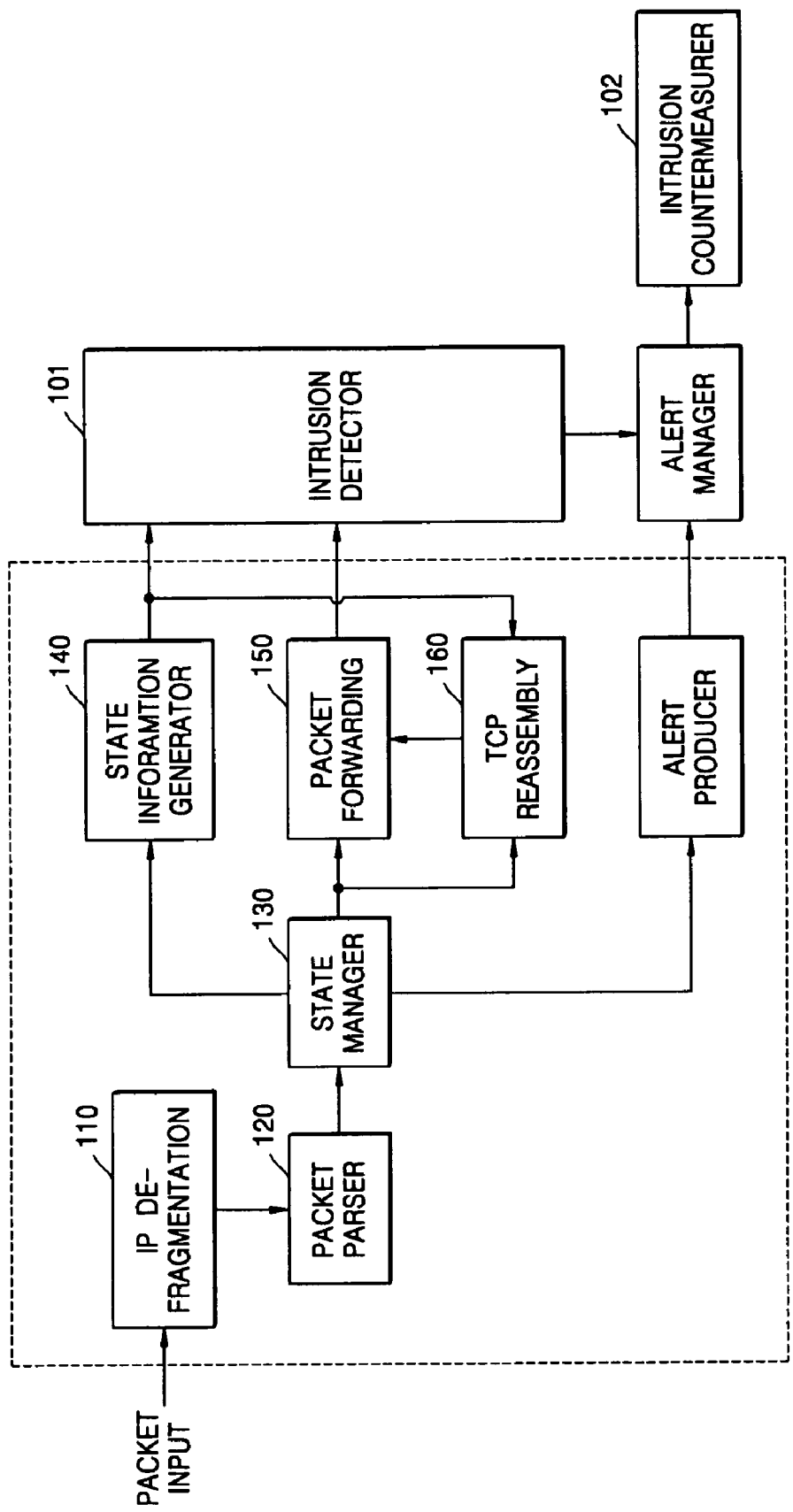
FIG. 1 is a block diagram of a session stateful intrusion detection system according to an embodiment of the present invention.

The present invention will now be described more fully with reference to the accompanying drawings, in which exemplary embodiments of the invention are shown. Like reference numerals in the drawings denote like elements, and thus their description will be omitted. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a block diagram of a session stateful intrusion detection system according to an embodiment of the present invention. Referring to FIG. 1, the session stateful intrusion detection system comprises an IP De-fragmentation module 110, a packet parser 120, a state manager 130, a state information generator 140, a packet forwarder 150, a transmission control protocol (TCP) re-combiner 160, an alert producer, an intrusion detector 101, an alert manager, and an intrusion countermeasurer 102.

When an Internet protocol (IP) packet is input to the session stateful intrusion detection system, the session stateful intrusion detection system reassembles the packet through the IP De-fragmentation module 110 and extracts frequently used information such as a sequence number, an acknowledge number, a window size, TCP flags, etc. from header information of the packet in the packet parser 120.

The state manager 130 generates, manages, and deletes a session corresponding to the input packet. To this end, the state manger 130 effectively manages several hundreds of thousands to several millions sessions and performs a countermeasure against a denial of service (DoS) attack using a 2-stage state table management method with limited resources.

The state information generator 140 generates state information of the session corresponding to the input packet that is managed via the 2 stage state table and transmits the generated state information to the intrusion detector 101.

The packet forwarder 150 forwards the state information of the session to the intrusion detector 101 through the state information generator 140.

The TCP reassembler 160 reassembles the TCP packet using the packet information forwarded to the state manager 130 and the state information of the session forwarded to the state information generator 140 and forwards the reassembled TCP packet to the intrusion detector 101 through the packet forwarder 150.

The intrusion detector 101 detects intrusions based on the information received from the state information generator 140 and the packet forwarder 150.

The state manager 130 tracks the state information of the session during TCP hand shaking, and issues an alert for a packet transited to an abnormal state, so that the intrusion countermeasurer 102 performs the countermeasure against an attack corresponding to the issued alert.

Figure 2:
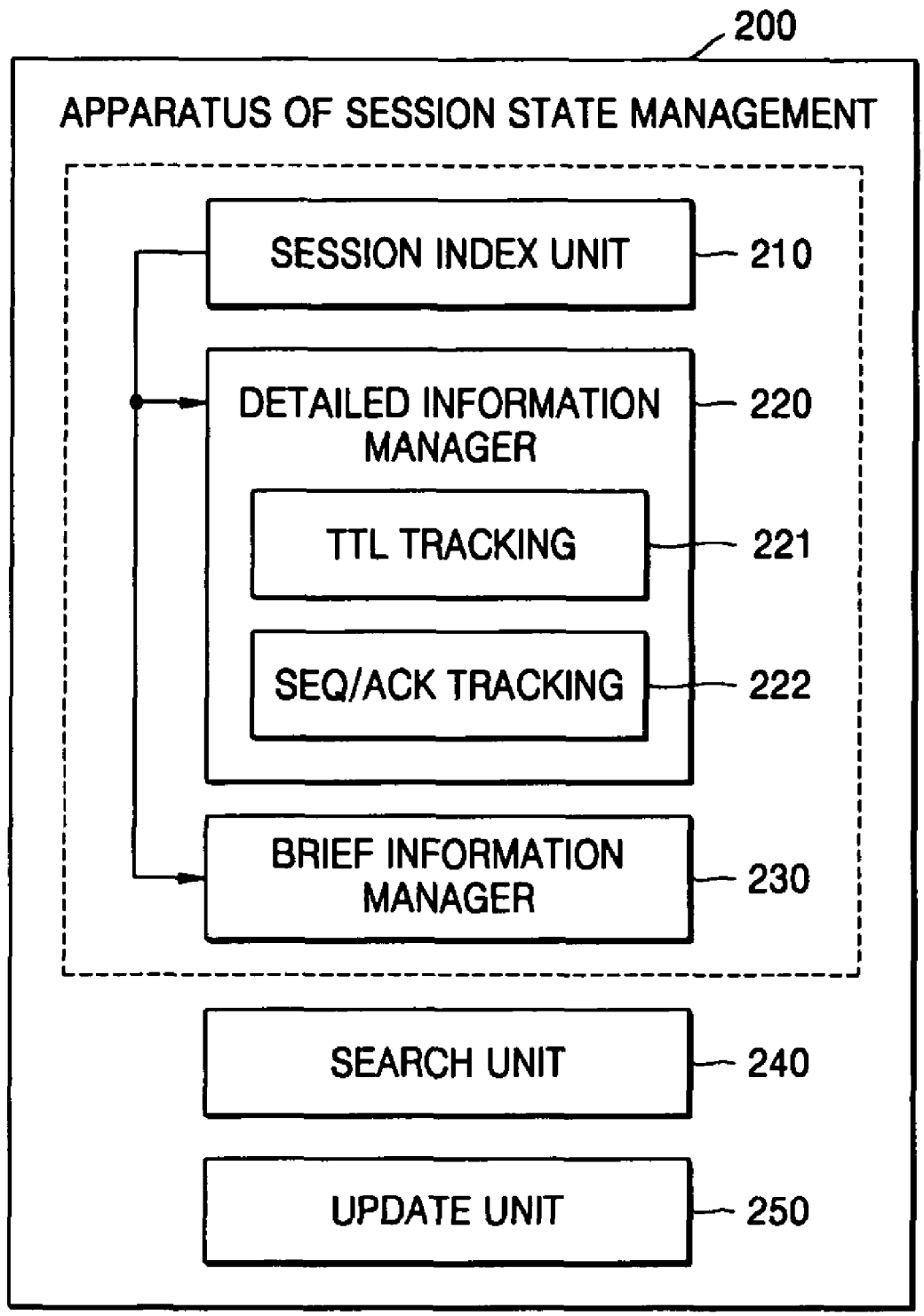
FIG. 2 is a block diagram of a session state management apparatus according to an embodiment of the present invention.

FIG. 2 is a block diagram of an apparatus 200 for managing a session state according to an embodiment of the present invention. Referring to FIG. 2, the apparatus 200 for managing a session state comprises a session index unit 210, a detailed information manager 220, a brief information manager 230, a search unit 240, and an update unit 250.

A TCP attack is made in several seconds immediately after a TCP 3-way handshaking is completed. Therefore, the apparatus 200 for managing a session state manages a lot of detailed state information on a session in which a short amount of time passes after a session connection has been established via the TCP 3-way handshaking, and manages brief state information on a session in which a lot of time passes after the session connection has been established, thereby completing the session state information management with limited resources. A more detailed constitution will now be described.

The session index unit 210 produces and manages an index including 5-tuple information (a protocol, a source IP address, a destination IP address, a source port number, and a destination port number) of a session corresponding to an input packet.

The state information of the session corresponding to the input packet included in the index points to entry addresses stored in the detailed information manager 220 and/or the brief information manager 230.

The detailed information manager 220 manages a lot of detailed state information on the session in which a short amount of time passes after the session connection has been established via the TCP 3-way handshaking, thereby responding to the TCP attack. An embodiment of the detailed information manager 220 is illustrated in FIG. 4.

The brief information manager 230 produces and manages an entry including information on connection and disconnection states of the session corresponding to the input packet and information on directionality of the packet with regard to the session in which a lot of time passes after the session connection has been established.

The brief information manger 230 produces and manages brief state information of the session in which a lot of time passes after the session connection has been established, thereby considerably reducing memory resources and providing information on states of a lot of sessions. An embodiment of the brief information manger 230 is illustrated in FIG. 5.

The search unit 240 searches an index of the session corresponding to the input TCP packet in the session index unit 210, and, if the index is not searched, searches the brief information manager 230 after the session connection is established.

When a synchronize sequence number (SYN) packet requesting the session connection is input to the apparatus 200 for managing a session state, and the search unit 240 fails to search an index of a session corresponding to the input SYN packet, the session index unit 210 determines whether the session index unit 210 is full in producing a new index. If the session index unit 210 is determined to be full, the session index unit 210 deletes the longest used index using a least recently used (LRU) algorithm, and produces a new index including the 5-tuple information of the session. This will be described in detail with reference to FIG. 6.

When the search unit 240 fails to search the index of the session corresponding to the input TCP packet after the session connection is established, it searches the brief information manager 230. In this regard, the index points to the entry included in the brief information manager 230 corresponding to the input TCP packet using a hash address generated based on the 5-tuple information of the session, thereby more quickly searching the entry included in the brief information manager 230.

The hash address is generated by a hash key generator 330 (refer to FIG. 3) based on the 5-tuple information of the session corresponding to the input TCP packet, which serves as a key.

When the search unit 240 has as searched the index of the session corresponding to the input TCP packet, the update unit 250 updates the entry, pointed to by the index, of the detailed information manager 220.

When a SYN/ACK packet is input in response to the SYN packet, the update unit 250 searches the session index unit 210, and, if the index is searched, updates the detailed information manager 220 pointed to by the index. However, when the index is not searched in the session index unit 210, since the SYN packet is not transmitted, the received SYN/ACK packet is an abnormal packet, resulting in the issuance of an alert.

Figure 3:
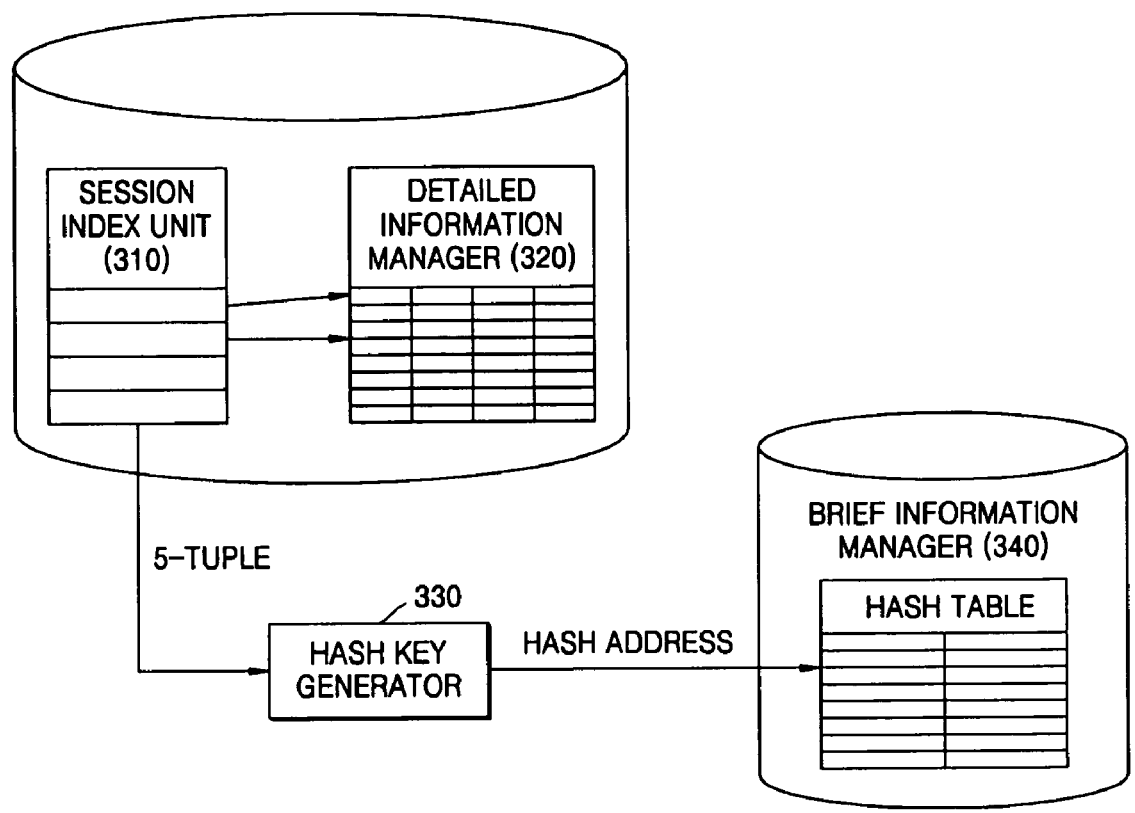
FIG. 3 is a block diagram for illustrating a method of managing 2-stage session state information using an apparatus for managing a session state according to an embodiment of the present invention.

FIG. 3 is a block diagram for illustrating a method of managing 2-stage session state information using an apparatus for managing a session state according to an embodiment of the present invention. More specifically, FIG. 3 is a view illustrating a method of managing 2-stage session state information using an apparatus for managing a session state according to TCP 3-way handshaking. Referring to FIG. 3, when a SYN packet requesting a TCP session is input to the apparatus for managing a session state, a session index unit 310 produces an index including 5-tuple information of the TCP session. The index is used to search a session corresponding to the input SYN packet in a detailed information manager 320 or a brief information manager 340.

When the session index unit 310 produces the index, the detailed information manager 320 is filled with detailed information on states of sessions extracted from each of a plurality of fields of the input SYN packet.

Thereafter, when a SYN/ACK packet is input in response to the SYN packet, the search unit 240 searches the session index unit 310. If an index of the session corresponding to the input SYN/ACK packet exists in the session index unit 310, the update unit 250 updates the detailed information manager 320.

When an acknowledgement (ACK) packet informing of a safe arrival of the SYN/ACK packet is input, the search unit 240 searches the session index unit 310. If an index of the session corresponding to the input ACK packet exists in the session index unit 310, the update unit 250 updates the detailed information manager 320, and produces an entry including brief state information on a session in a hash table of the brief information manager 340.

A hash key generator 330 generates a hash address based on the 5-tuple information on the session included in the index. The hash address points to an entry corresponding to the input session included in the brief information manager 340.

FIG. 4 is a table of detailed session state information stored in the detailed information manager 220 illustrated in FIGS. 2 and 3. Referring to FIG. 4, the detailed session state information stored in the detailed information manager 220 is used to respond to an intrusion detection and more accurately determine a session connection state. That is, the detailed session state information stored in the detailed information manager 220 is used to inspect and track fields of an input packet so as to determine whether the input packet is normal.

Figure 7:
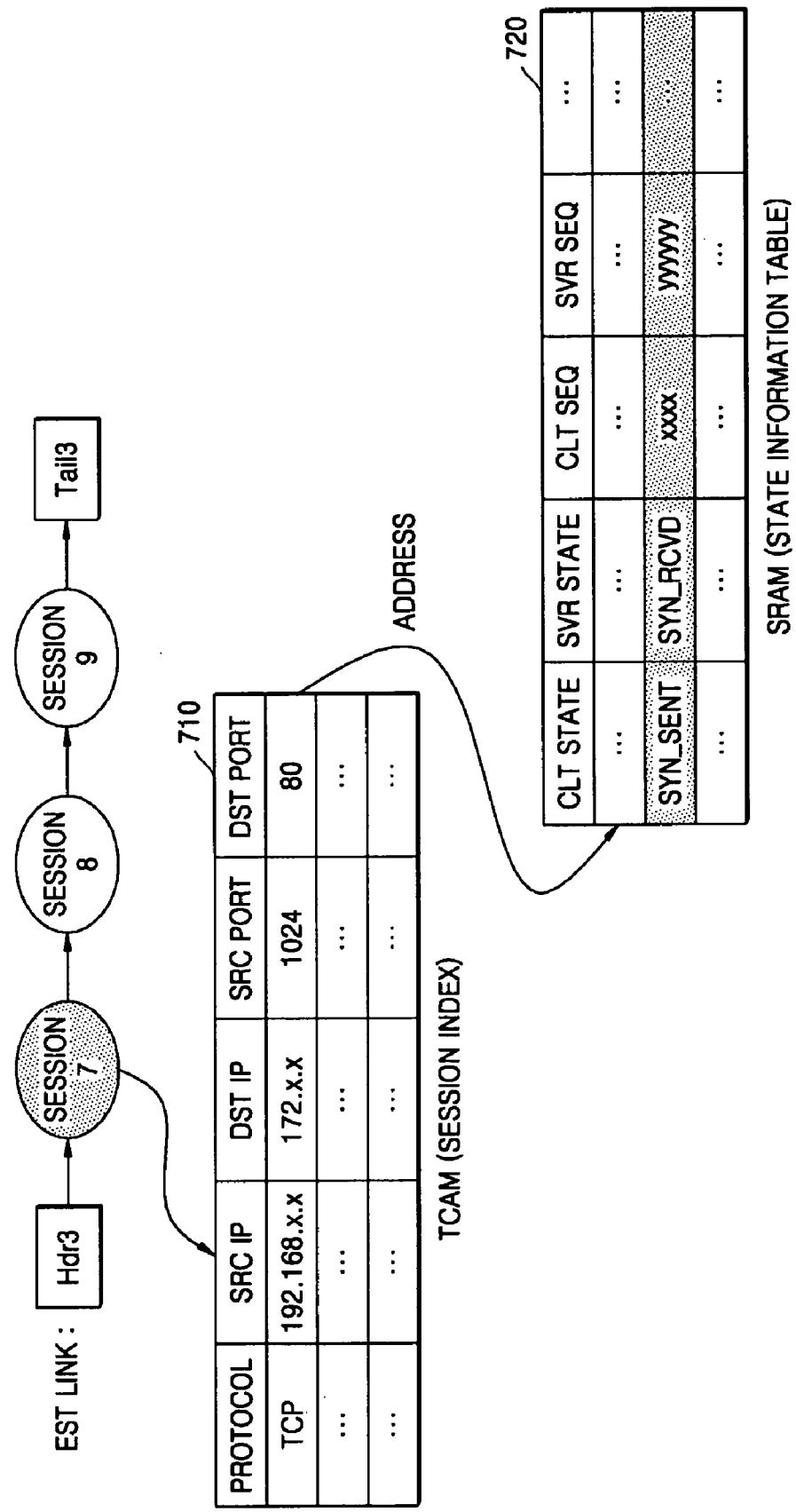
FIG. 7 illustrates a structure of the detailed information manager of FIGS. 2 and 3 according to an embodiment of the present invention.
Figure 8:
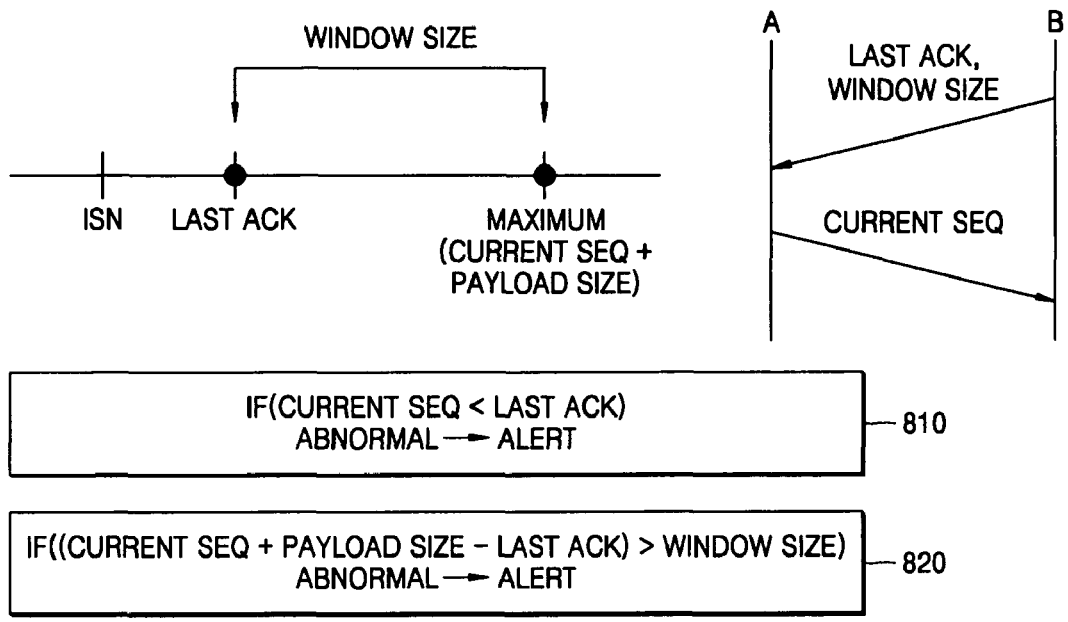
FIG. 8 is a flowchart of a time to live (TTL) tracking process as an attack detection function performed by the detailed information manager of FIGS. 2 and 3 according to an embodiment of the present invention.

The session state information for responding to the intrusion detection is client state information, server state information, extendible connection state information for tracking a session state in an application protocol level, time to live (TTL) tracking information as illustrated in FIGS. 7 and 8, abnormal packet detection information for Seq/Ack number tracking, and other necessary information.

FIG. 5 is a table of brief session state information stored in the brief information manager 230 illustrated in FIGS. 2 and 3. Referring to FIG. 5, the brief session state information stored in the brief information manager 230 is minimum information of core state information used to detect an intrusion such as a TCP attack.

The brief session state information may be information on connection and disconnection states indicating that an input packet is a currently connected session, information on directionality of the input packet, and the like.

The brief information manager 230 may not store a lot of detailed session state information compared to the detailed information manager 220. Therefore, since it is difficult to exactly track a session disconnection process, the brief session state information is half-close information for tracking a brief disconnection process using the number of input FIN (finish) packets.

The above example is one embodiment, and the brief information manger 230 can store extendible information.

Figure 6:
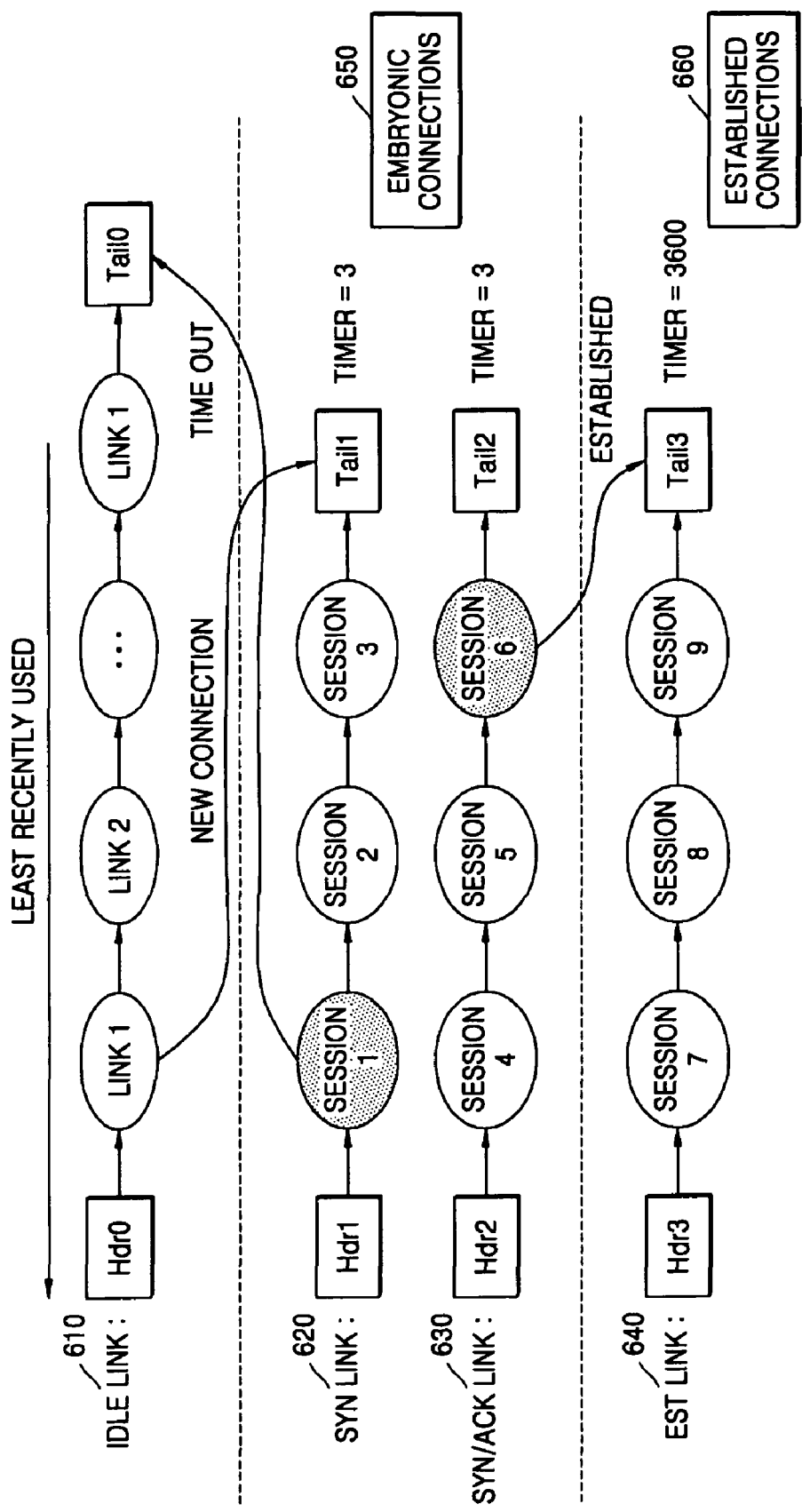
FIG. 6 is a view for illustrating a method of managing a memory using the detailed information manager of FIGS. 2 and 3 to provide a protection mechanism against a denial of service (DoS) attack.

FIG. 6 is a view for illustrating a method of managing a memory using the detailed information manager 220 of FIG. 2 or 3 to provide a protection mechanism against a denial of service (DoS) attack.

An apparatus for tracking a session state is vulnerable to a SYN flooding attack. In detail, a very tiny buffer exists to quickly perform handshaking for establishing a session interposed between a TCP client and a server in a network. A packet for establishing the session includes a SYN field for recognizing a sequence of message exchanges.

If a predetermined time passes without any reaction after an attacker very quickly request a plurality of connections, packets that the buffer contains are useless. However, a lot of false connection requests make it difficult to establish a normal connection request session, which requires an adjustment of the elapsed time.

To respond to the SYN flooding attack, the detailed information manager 220 manages sessions using four linked lists, i.e., an IDLE Link 610, a SYN Link 620, a SYN/ACK Link 630, and an EST Link 640.

The detailed information manager 220 generates the linked lists at each of operations of receiving a SYN packet, transmitting a SYN/ACK packet, and receiving an ACK packet during TCP 3-way handshaking. A session entry moves from the IDLE Link 610 to the EST Link 640 by the packets during the TCP 3-way handshaking. This link movement enables to be effectively managed session connection state information to be managed a memory.

More specifically, the IDLE Link 610 that is a list for connecting links to which a session is not assigned, if a new session is generated, assigns a link to a head of the IDLE Link 610, adds the session to a tail of the generated linked list, if the session is deleted due to overtime, and returns the assigned link to a tail of the IDLE Link 610, to manage the memory.

If the input SYN packet requires another session, the IDLE Link 610 assigns a link and adds a session to a tail of the SYN Link 620. Thereafter, if the SYN/ACK packet is input, a session entry moves from the SYN Link 620 to the SYN/ACK Link 630. If the ACK packet is input, the session entry moves from the SYN/ACK Link 630 to the EST Link 640.

In this regard, a network manager can establish a time required to move a session entry from a first link to a second link and add a session to a tail of the second link. In detail, the network manager establishes the movement time as a predetermined threshold value, i.e., a time-out value, and aggressively prevents an entry table of the detailed information manager 220 from being full due to an intended attack of a network attacker.

When an embryonic connection 650 moves from the IDLE Link 610 to the SYN/ACK Link 630 via the SYN Link 620, the network manager establishes the time-out value as a relatively small value, e.g., 3 seconds, since a session is not completely established. When an established connection 660 moves from the SYN/ACK Link 630 to the EST Link 640, the network manager establishes the time-out value as a relatively large value, e.g., 360 seconds, since the session is completely established.

When timeout occurs in each of the links, a session entry of each of the links is returned to a tail of a previous linked list. That is, when the timeout occurs in the SYN Link 620, the session entry is returned to the tail of the IDLE Link 610.

This aggressive aging is used to aggressively prevent the entry table of the detailed information manager 220 from being full to respond to the DoS attack such as the Syn flooding. In addition, session entry information that is returned when the timeout occurs is used to detect a distributed DoS (DDoS) attack or an Internet war.

The link movement enables a session entry to return to a tail, which results in the deletion of a header of the longest used session using a least recently used (LRU) algorithm when the entry table of the detailed information manager 220 is full.

Since the entry table managing sessions has a limited capacity, it is probably full at any given time. When it is necessary to generate another entry when the session entry is full, a least used session entry is deleted using the LRU algorithm and another entry is added. That is because even if the entry table is full, the session stateful intrusion detection system must detect a new attack.

FIG. 7 illustrates a structure of the detailed information manager 220 of FIGS. 2 and 3 according to an embodiment of the present invention. Referring to FIG. 7, the detailed information manager 220 uses 5-tuple information of a session including a protocol, a source IP address, a destination IP address, a source port number, and a destination port number which are contained in an index in order to discriminate session entries.

The index including the 5-tuple information of the session is stored in a ternary content addressable memory (TCAM) 710.

The detailed information manager 220 that includes virtual state information of a session corresponding to an input packet is stored in a static random access memory (SRAM) 720.

The index stored in the TCAM 710 points to a memory address of the entry stored in the SRAM 720. The current embodiment of the present invention is realized as hardware-based session index unit 210 and the detailed information manager 220 and thus can be replaced, modified, and substituted within the scope of the technical idea of the invention.

Figure 9:
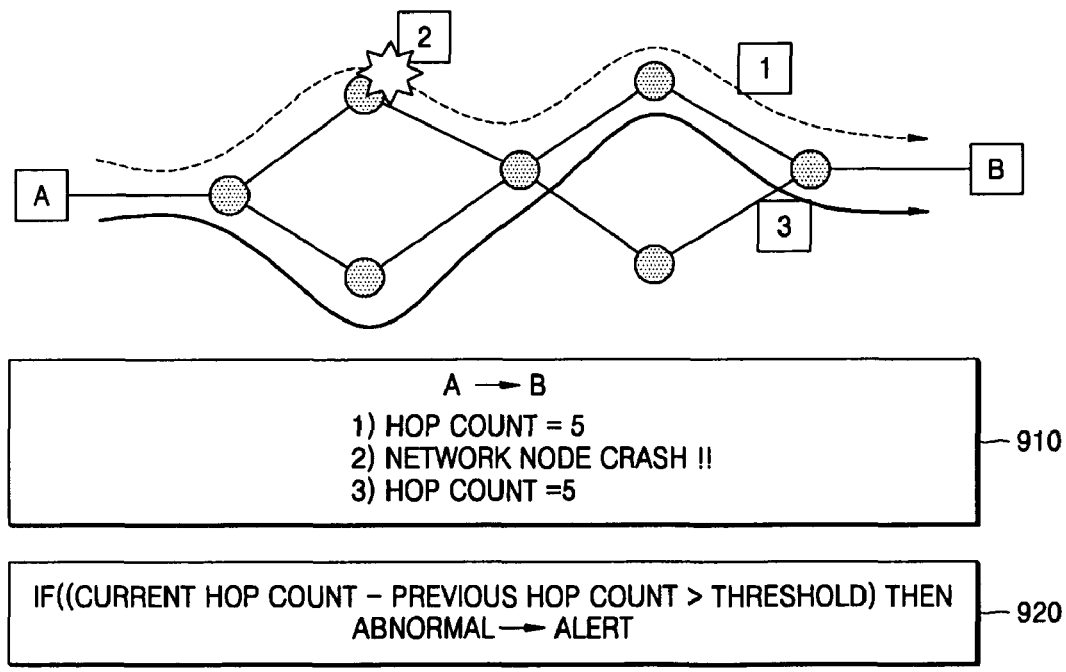
FIG. 9 is a flowchart of a Sequence/Acknowledge number tracking process as an attack detection function performed by the detailed information manager of FIGS. 2 and 3 according to an embodiment of the present invention.

FIG. 8 is a flowchart of a TTL tracking process as an attack detection function performed by the detailed information manager 220 according to an embodiment of the present invention. Referring to FIG. 9, the detailed information manager 220 comprises a TTL tracking alert issuer (not shown). When a session is completely established, the TTL tracking alert issuer determines whether a packet belonging to the session is normal since packets belonging to the same session do not have a different hop count, and, if a difference between TTL values of a current packet and a previous packet exceeds a predetermined threshold, issues an alert (Operations 910 and 920).

FIG. 8 is a flowchart of a Sequence/Acknowledge number tracking process as an attack detection function performed by the detailed information manager 220 according to an embodiment of the present invention. Referring to FIG. 8, if hosts A and B communicate with each other, a SEQ/ACK number tracking alert issuer (not shown) stores an acknowledge number of a packet transmitted to the host A and window size information (the size of window of the host B) in the detailed information manager 220. If a sequence number of the packet transmitted from the host A to the host B is smaller than a last Ack transmitted from the host B to the host A (Operation 810), or a value obtained by subtracting the last Ack from a value obtained by summing the sequence number and a payload size is bigger than the window size value (Operation 820), the SEQ/ACK number tracking alert issuer (not shown) determines that the packet is abnormal and issues an alert.

Figure 10:
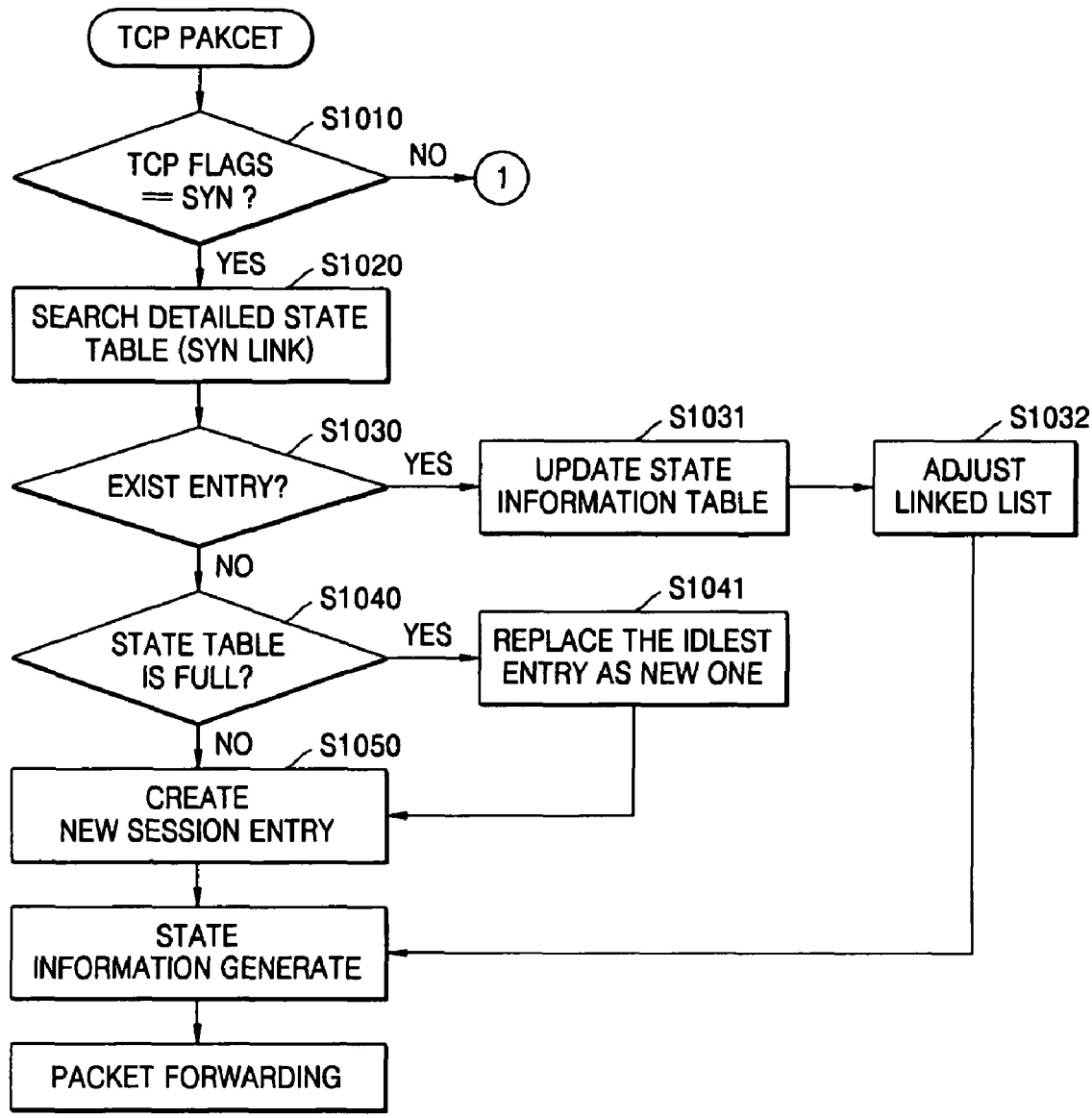
FIG. 10 is a flowchart of a SYN packet processing method using a transmission control protocol (TCP) flag value according to an embodiment of the present invention.

FIG. 10 is a flowchart of processing a SYN packet using a TCP flag value according to an embodiment of the present invention. Referring to FIG. 10, a SYN flag is used only when a session is completely established and synchronizes sequence numbers of a client and a server before transmitting data.

When a SYN packet is input (Operation S1010), the detailed information manager 220 searches the SYN Link 620 (Operation S1020). If a session entry corresponding to the SYN packet exists in the SYN Link 620 (Operation S1030), since the SYN packet is retransmitted, the detailed information manager 220 updates a session entry including session state information (Operation S1031), and adjusts the session entry to move from the SYN Link 620 of the linked lists illustrated in FIG. 6 to a tail (Operation S1032).

If a session entry corresponding to the SYN packet does not exist in the SYN Link 620, when the session index unit 210 is not full (Operations S1040), another index is generated (Operation S1050). When the session index unit 210 is full, the longest least frequently used index is deleted using the LRU algorithm, and another index is generated (Operations S1040 and S1041).

Figure 11:
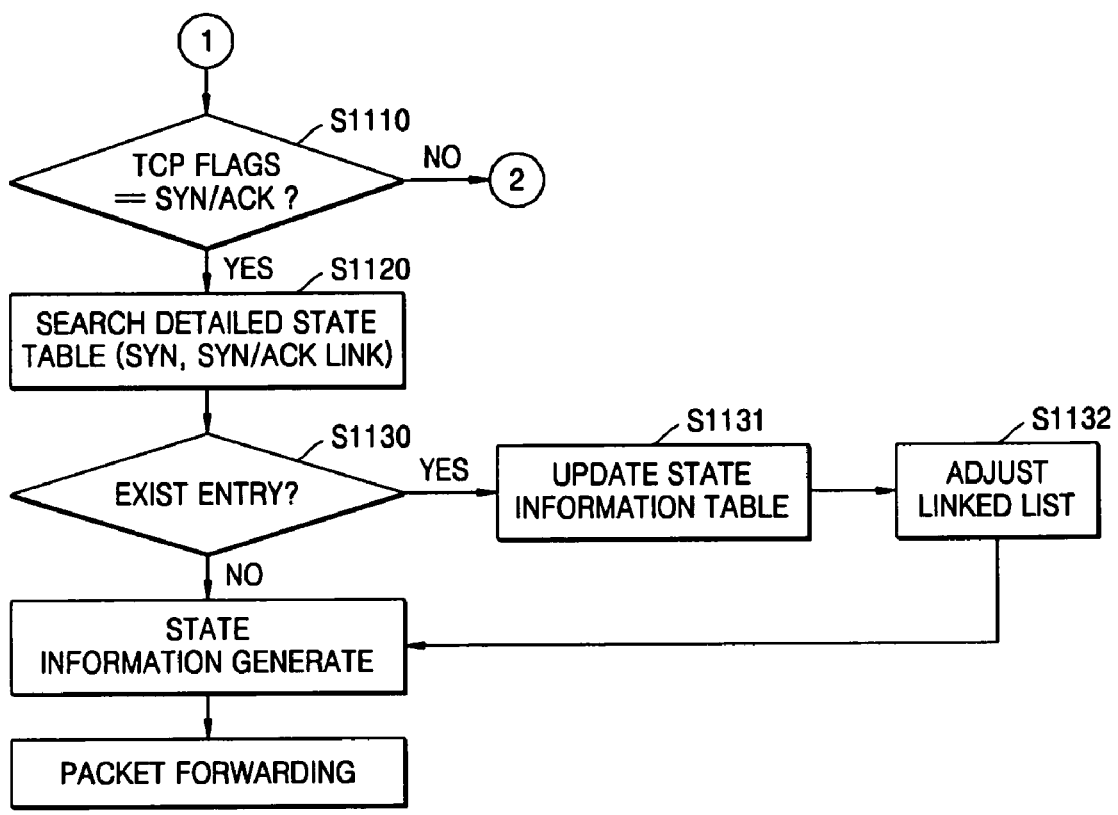
FIG. 11 is a flowchart of a SYN/ACK packet processing method according to an embodiment of the present invention.

FIG. 11 is a flowchart of processing a SYN/ACK packet according to an embodiment of the present invention. Referring to FIG. 11, when the SYN/ACK packet is input (Operation S1110), the detailed information manager 220 searches the SYN Link 620 and the SYN/ACK Link 630 (Operation S1120). If a session entry corresponding to the SYN/ACK packet exists in the SYN Link 620 (Operation S1130), the detailed information manager 220 moves the session entry to the SYN/ACK Link 630 (Operation S1131) and updates session state information of the session entry (Operation S1132).

If the session entry corresponding to the SYN/ACK packet exists in the SYN/ACK Link 630, since the SYN/ACK packet is retransmitted, the detailed information manager 220 updates a session entry including session state information, and adjusts the session entry to move from the SYN/ACK Link 630 to a tail.

Figure 12:
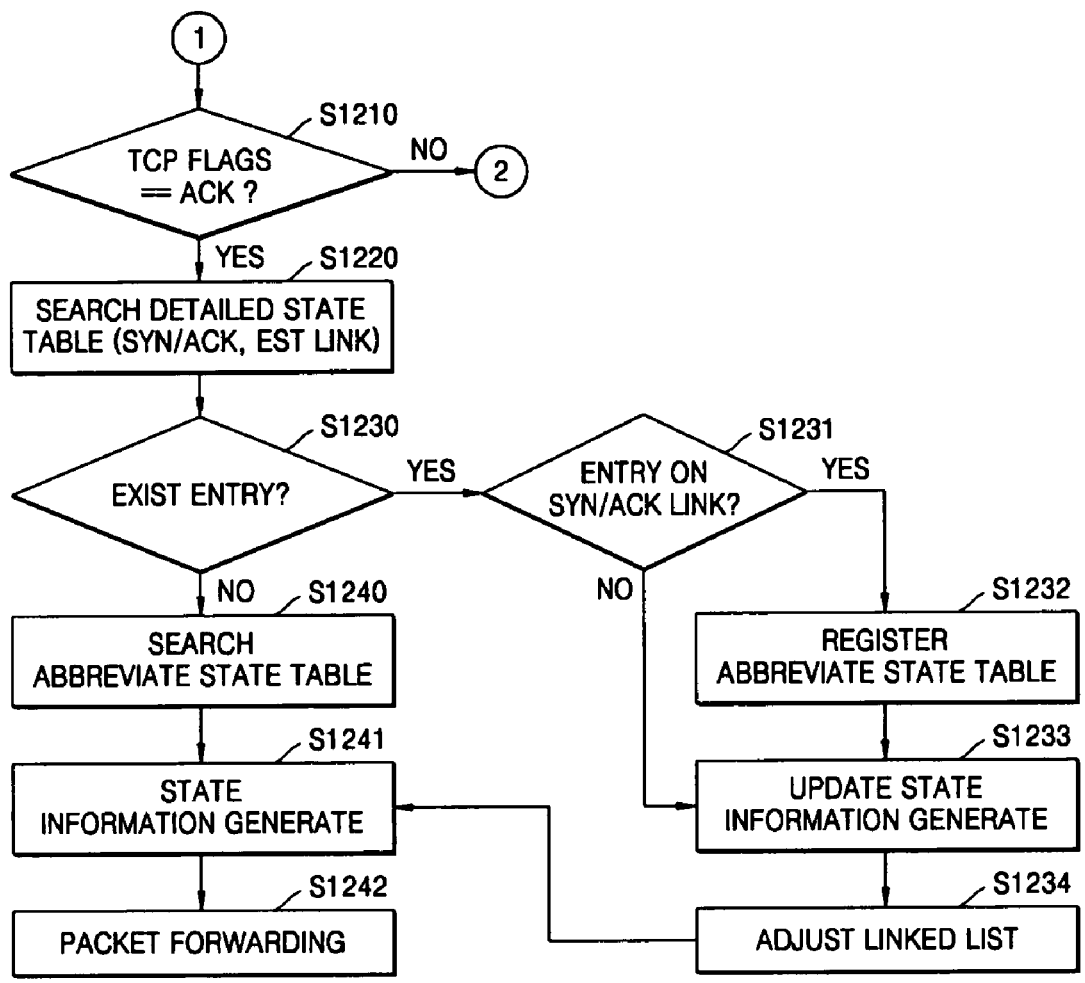
FIG. 12 is a flowchart of processing an ACK packet according to an embodiment of the present invention.

FIG. 12 is a flowchart of processing an ACK packet according to an embodiment of the present invention. Referring to FIG. 12, an ACK flag is used to inform of a safe arrival of a packet, and searches the SYN/ACK Link 630 and the EST Link 640 (Operation S1220) when the ACK packet is input (Operation S1210).

If a session entry corresponding to the ACK packet exists in the SYN/ACK Link 630, the session entry is moved to the EST Link 640 and brief session state information is stored in the brief information manager 240 (Operations S1230 through S1234).

If a session entry corresponding to the ACK packet does not exist in the SYN/ACK Link 630, the brief information manager 240 is searched to generate a session entry including the brief session station information, store the session entry, and forward the ACK packet (Operations S1240 through S1242).

Figure 13:
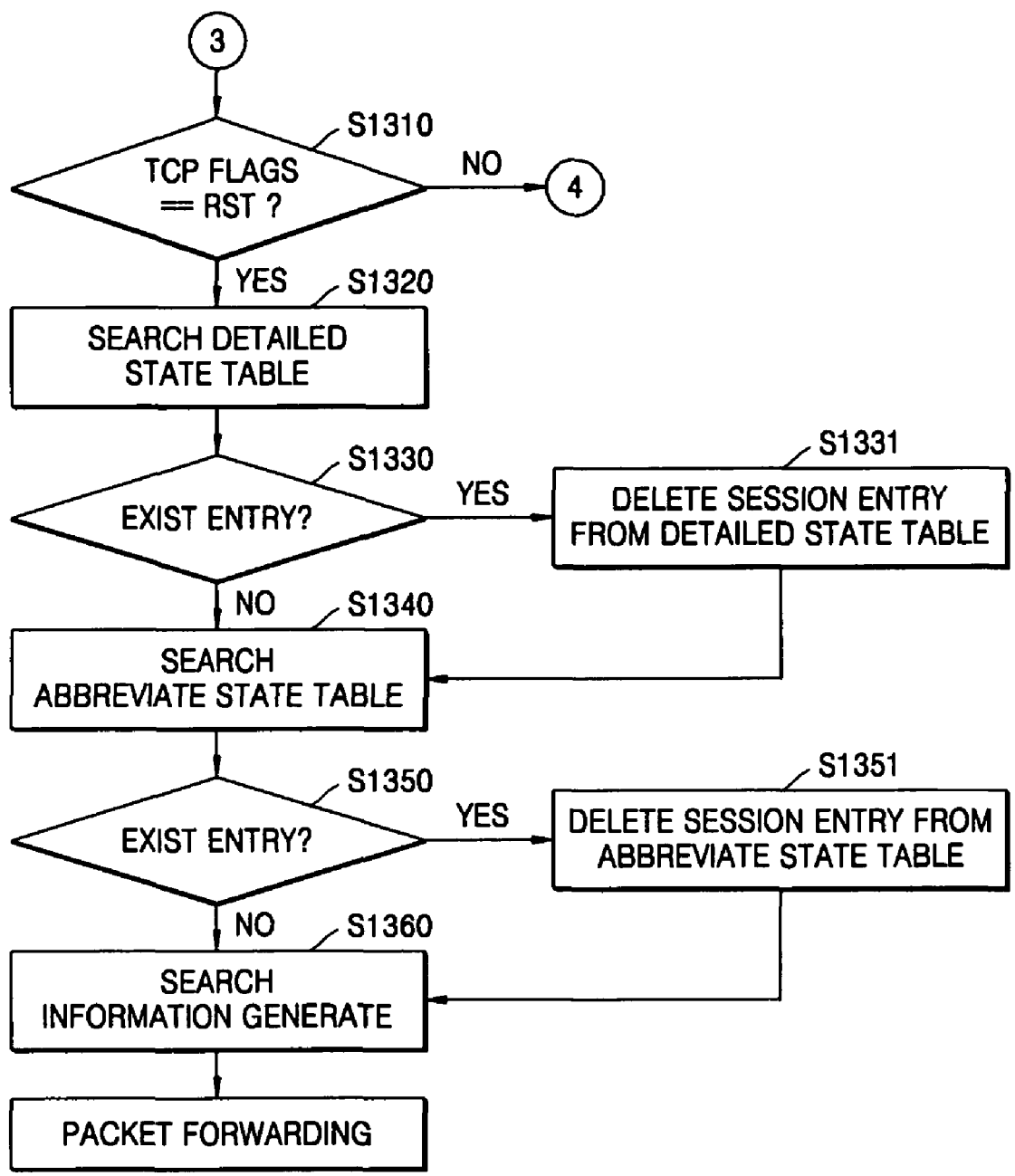
FIG. 13 is a flowchart of processing a RST packet according to an embodiment of the present invention.

FIG. 13 is a flowchart of processing a RST packet according to an embodiment of the present invention. Referring to FIG. 13, a RST (rest) flag that resets connection states of related sessions searches the detailed information manager 220 and the brief information manager 240 (Operations S1320 and S1340) when the RST packet is input (Operation S1310). If an entry of a session corresponding to the RST packet exists in the detailed information manager 220 and the brief information manager 240 (Operations S1330 and S1350), the session entry is deleted from entry tables of the detailed information manager 220 and the brief information manager 240 to generate session state information (Operation S1360), and forward the RST packet.

Figure 14:
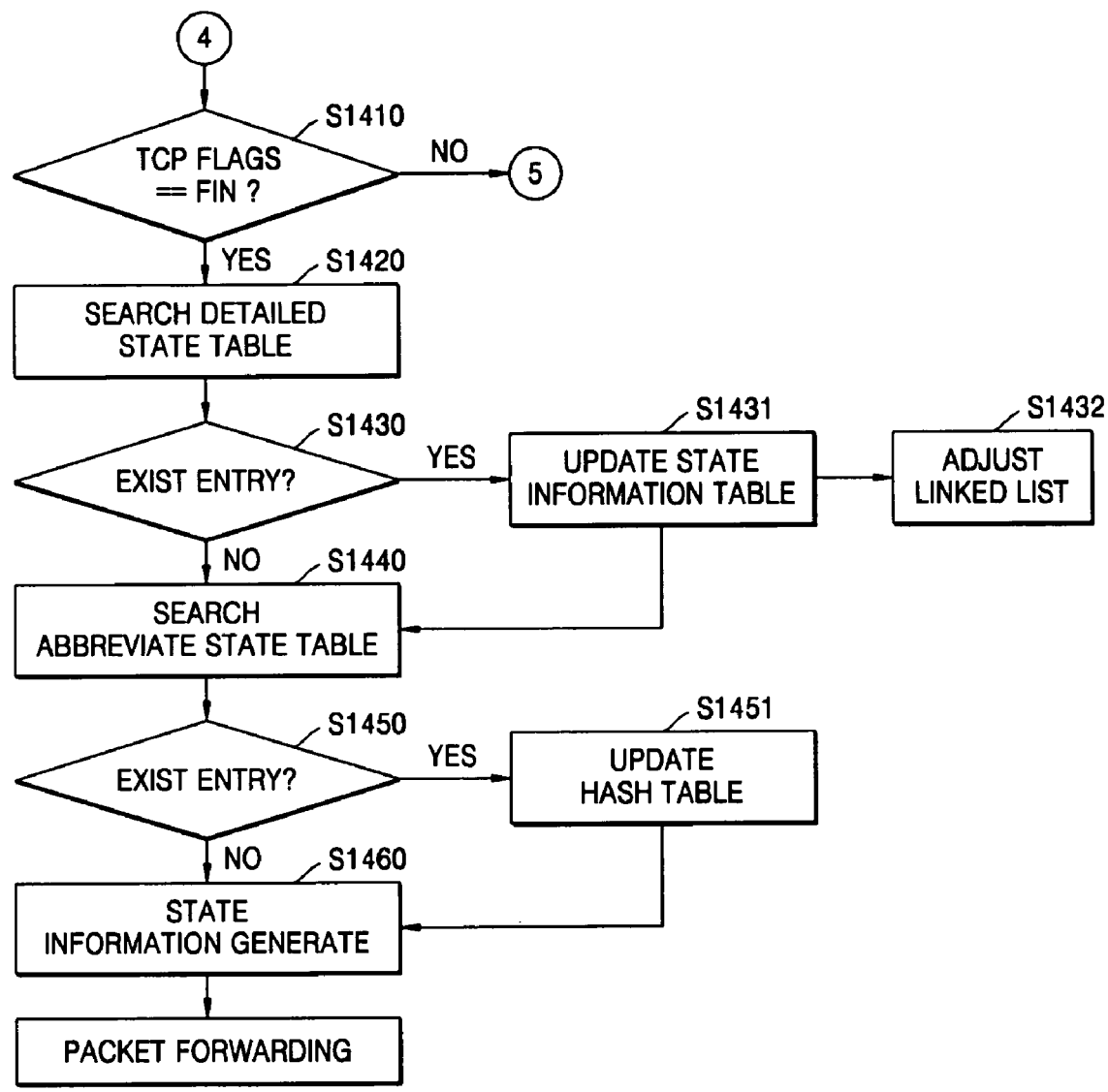
FIG. 14 is a flowchart of processing a FIN packet according to an embodiment of the present invention.

FIG. 14 is a flowchart of processing a FIN packet according to an embodiment of the present invention. Referring to FIG. 14, a FIN flag that releases a connection state of a session when a TCP has no data to transmit searches the detailed information manager 220 when the FIN packet is input (Operation S1410). If an entry of a session corresponding to the FIN packet exists in the detailed information manager 220, the brief information manager 240 is searched. If a session entry does not exist in the detailed information manager 220, session state information is generated to forward the FIN packet.

Figure 15:
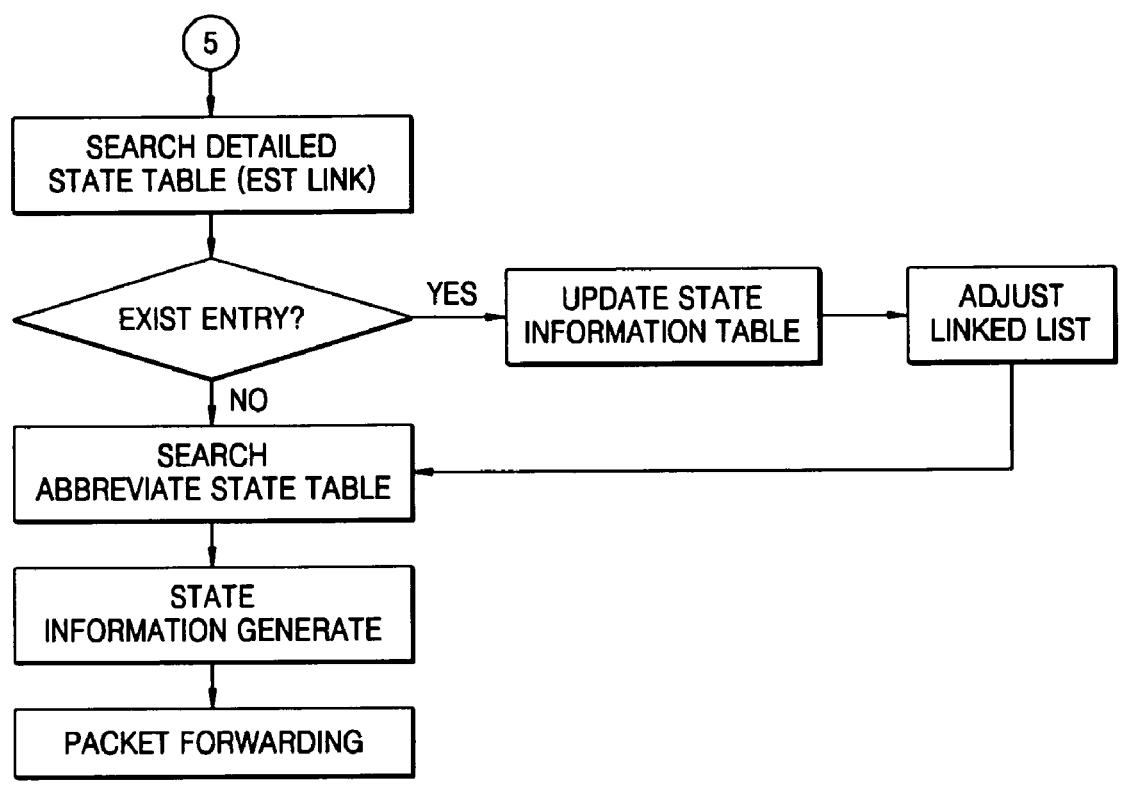
FIG. 15 is a flowchart of processing other packets which are not illustrated in FIGS. 10 through 14 according to an embodiment of the present invention.

FIG. 15 is a flowchart of processing other packets which are not illustrated in FIGS. 10 through 14 according to an embodiment of the present invention. Referring to FIG. 15, if packets other than the SYN, SYN/ACK, ACK, RST, and FIN packets are input, the detailed information manager 220 and the brief information manager 240 are searched to generate detailed information and forward packets.

The present invention can also be; embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The present invention shows an effective performance of several hundreds of thousands to several millions sessions with limited resources in a giga scale Internet network.

The present invention tracks session state information, generates useful session state information, and transmits the session state information to an intrusion detection engine, thereby reducing a false positive alert and detecting an attack and an abnormal packet using packet information and the session state information.

Also, the present invention uses a memory management method to aggressively respond to a DoS attack such as SYN flooding.

The present invention can more accurately detect an attack by adding the session state information to a conventional hardware-based simple pattern matching intrusion detection function.

The present invention can be applied to a firewall, a virtual private network (VPN), traffic monitoring, traffic load balancing, accounting and charging, and a network intrusion detection system (NIDS).

In particular, the present invention applied to a session stateful NIDS can obtain a very excellent output in terms of function and performance.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A microprocessor based apparatus for managing a session state in the process of transmission control protocol (TCP) handshaking, the apparatus comprising:

a session index unit producing and managing an index including 5-tuple information of a session corresponding to an input packet;

a detailed information manager generating and managing an entry by extracting state information of a session in which a predetermined time does not elapse after the session has been completely established, to respond to an intrusion detection against the input packet when the index is produced, wherein the detailed information manager is configured to determine that the session is abnormal when a difference between a current hop count and a previous hop count is greater than a predetermined threshold, wherein the detailed information manager is configured to determine that the session is abnormal when a sequence number of a packet transmitted from a first host to a second host is smaller than an acknowledge number associated with a last transmitted package from the second host to the first host,
wherein the detailed information manager is configured to determine that the session is abnormal when a sum of the sequence number and a payload size of the packet transmitted from a transmitting host is greater than a last acknowledge window size of the transmitting host;
a brief information manager generating and managing an entry including state information, which includes states of session connection and disconnection and directionality of the input packet, of a session in which a predetermined time elapses after the session has been completely established; and
a search unit searching an index of the session corresponding to the input packet in the session index unit, and, if an index does not exist, searching the brief information manager after the session has been completely established.

2. The apparatus of claim 1, wherein the session index unit uses a least recently used (LRU) algorithm that sequentially stores the indexes and, if the session index unit is full, deletes a least recently used index.

3. The apparatus of claim 1, wherein the detailed information manager uses the LRU algorithm that sequentially stores the entries and, if the detailed information manager is full, deletes a least recently used entry.

4. The apparatus of claim 1, wherein the detailed information manager generates linked lists for each of operations of receiving a SYN packet, transmitting a synchronize sequence number/acknowledge (SYN/ACK) packet, and receiving an ACK packet during TCP 3-way handshaking in addition to an initial linked list, and adds the entries to the linked list corresponding to each of the packets when the packets are input,
wherein, if time required to add the entries to the linked list exceeds a predetermined critical threshold, the entries are inserted into a tail of the initial linked list.

5. The apparatus of claim 1, wherein, if an index of a session corresponding to an input SYN packet does not exist in the search unit, the session index unit generates an index including the 5-tuple information of the session corresponding to the SYN packet.

6. The apparatus of claim 1, wherein the search unit further comprises an update unit, if an index of a session corresponding to an input TCP packet exists in the detailed information manager, updating an entry of the detailed information manager.

7. The apparatus of claim 1, wherein the index points to a memory address of the entry corresponding to the input packet.

8. The apparatus of claim 1, wherein the index points to the entry included in the brief information manager corresponding to the input packet using a hash address generated based on the 5-tuple information of the session.

9. The apparatus of claim 1, wherein the detailed information manager further comprises a time to live (TTL) tracking alert issuer issuing an alert when a difference between TTL values of a current packet and a previous packet exceeds a predetermined threshold in order to determine whether a packet belonging to the session is normal if the session is completely established.

10. The apparatus of claim 1, wherein the detailed information manager further comprises a SEQ/ACK number tracking alert issuer issuing an alert when a sequence number of a packet transmitted after the input packet is received is smaller than a last ACK number of the input packet, or a value obtained by subtracting the last ACK number from a value obtained by summing the sequence number and a payload size is bigger than the size of a window.

11. The apparatus of claim 1, wherein the session index unit is realized in a ternary content addressable memory (TCAM).

12. The apparatus of claim 1, wherein the detailed information manager is realized in a static random access memory (SRAM).

13. The apparatus of claim 1, wherein, when a TCP flag value of the input packet is RST, if the detailed information manager or the brief information manager includes an entry including session state information, the entry is deleted from the detailed information manager or the brief information manager.

14. A non-transitory computer readable recording medium comprising written instructions that specify a method of managing a session state in the process of TCP handshaking, the method comprising:
(a) building an index table by producing and managing an index including 5-tuple information of a session corresponding to an input packet;
(b) generating a first entry table by generating and managing an entry by extracting state information of a session within a predetermined time before and after the session is completely established so as to respond to an intrusion detection against the input packet when the index is produced;
(c) generating a second entry table by generating and managing an entry including state information, which includes directionality of the input packet and states of the session connection and disconnection, of a session after a predetermined time after the session is completely established;
(d) searching an index of the session corresponding to the input TCP packet in the session index unit, and, if an index does not exist, searching the second entry table after the session is completely established;
e) determining that the session is abnormal when a difference between a current hop count and a previous hop count is greater than a predetermined threshold,
f) determining that the session is abnormal when a sequence number of a packet transmitted from a first host to a second host is smaller than an acknowledge number associated with a last transmitted package from the second host to the first host, and
g) determining that the session is abnormal when a sum of the sequence number and a payload size of the packet transmitted from a transmitting host is greater than a last acknowledge window size of the transmitting host.

15. The method of the non-transitory computer readable recording medium of claim 14, wherein the index table uses a LRU algorithm that sequentially stores the indexes and, if a session index unit is full, deletes a longest used index.

16. The method of the non-transitory computer readable recording medium of claim 14, wherein the first entry table uses a LRU algorithm that sequentially stores the entries and, if a detailed information manager is full, deletes a longest used entry.

17. The method of the non-transitory computer readable recording medium of claim 14, wherein generating the first entry table comprises:
generating an initial linked list;
generating linked lists for each of operations of receiving a SYN packet, transmitting a SYN/ACK packet, and receiving an ACK packet in the process of TCP 3-way handshaking;

adding the entries to the linked list corresponding to each of the packets when the packets are input;

determining whether time required to add the entries to the linked list exceeds a predetermined critical threshold; and inserting the entries into a tail of the initial linked list, if the time is determined to exceed the predetermined critical threshold.

18. The method of the non-transitory computer readable recording medium of claim 14, wherein operation (a) if an index of a session corresponding to an input SYN packet is not searched, generates an index including the 5-tuple information of the session corresponding to the SYN packet.

19. The method of claim 14, further comprising: (h) updating an entry of the first entry table, if an index of a session corresponding to an input TCP packet is searched.

20. The method of the non-transitory computer readable recording medium of claim 14, wherein the first entry table further comprises: issuing an alert when a difference between TTL values of a current packet and a previous packet exceeds a predetermined threshold in order to determine whether a packet belong to the session is normal if the session is completely established.

21. The method of the non-transitory computer readable recording medium of claim 14, wherein the first entry table further comprises: issuing an alert when a sequence number of a packet transmitted after the input packet is received is smaller than a last ACK number of the input packet, or a value obtained by subtracting the last ACK number from a value obtained by summing the sequence number and a payload size is bigger than the size of a window.

22. The method of the non-transitory computer readable recording medium of claim 14, wherein the index points to a memory address of the entry corresponding to the input packet.

23. The method of the non-transitory computer readable recording medium of claim 14, wherein the index points to an entry included in a brief information manager corresponding to the input packet using a hash address generated based on the 5-tuple information of the session.

* * * * *